United States Patent
Grgic

(10) Patent No.: US 7,684,876 B2
(45) Date of Patent: Mar. 23, 2010

(54) DYNAMIC LOAD BALANCING USING VIRTUAL CONTROLLER INSTANCES

(75) Inventor: Richard J. Grgic, Painsville, OH (US)

(73) Assignee: Rockwell Automation Technologies, Inc., Mayfield, OH (US)

( * ) Notice: Subject to any disclaimer, the term of this patent is extended or adjusted under 35 U.S.C. 154(b) by 350 days.

(21) Appl. No.: 11/679,394

(22) Filed: Feb. 27, 2007

(65) Prior Publication Data

US 2008/0208361 A1    Aug. 28, 2008

(51) Int. Cl.
G05B 11/01    (2006.01)
(52) U.S. Cl. ........................................ 700/19
(58) Field of Classification Search ................. 700/19, 700/20, 31; 717/136, 151, 168; 718/105
See application file for complete search history.

(56) References Cited

U.S. PATENT DOCUMENTS

| | | | |
|---|---|---|---|
| 5,142,469 A | 8/1992 | Weisenborn | |
| 5,796,603 A * | 8/1998 | Hodorowski | 700/2 |
| 5,826,244 A | 10/1998 | Huberman | |
| 5,875,461 A | 2/1999 | Lindholm | |
| 5,887,029 A | 3/1999 | Husted et al. | |
| 5,949,674 A | 9/1999 | Song et al. | |
| 5,970,243 A | 10/1999 | Klein | |
| 5,971,581 A | 10/1999 | Gretta et al. | |
| 6,055,370 A | 4/2000 | Brown et al. | |
| 6,338,130 B1 | 1/2002 | Sinibaldi et al. | |
| 6,373,836 B1 | 4/2002 | Deryugin et al. | |
| 6,453,460 B1 | 9/2002 | Keyes | |
| 6,615,092 B2 | 9/2003 | Bickely et al. | |
| 6,735,764 B2 | 5/2004 | Nakai | |
| 6,816,746 B2 | 11/2004 | Bickely et al. | |
| 6,901,446 B2 | 5/2005 | Chellis et al. | |
| 6,922,681 B2 | 7/2005 | Fromherz et al. | |
| 6,947,798 B2 | 9/2005 | Bronikowski et al. | |
| 7,039,740 B2 | 5/2006 | Glasco et al. | |
| 7,065,714 B1 | 6/2006 | Theel et al. | |
| 7,139,618 B2 | 11/2006 | Danz et al. | |
| 7,257,620 B2 | 8/2007 | Lo | |
| 7,272,815 B1 | 9/2007 | Eldridge et al. | |
| 7,374,524 B2 | 5/2008 | McCormick | |
| 7,472,387 B2 | 12/2008 | Nakano | |
| 2002/0129085 A1 | 9/2002 | Kubala et al. | |
| 2002/0194417 A1 | 12/2002 | Suzuki et al. | |
| 2003/0163508 A1 | 8/2003 | Goodman | |
| 2005/0024102 A1 | 2/2005 | Kondo | |

(Continued)

OTHER PUBLICATIONS

OA mailed Feb. 25, 2009 for U.S. Appl. No. 11/686,406, 29 pages.

(Continued)

*Primary Examiner*—Albert DeCady
*Assistant Examiner*—Chad Rapp
(74) *Attorney, Agent, or Firm*—Turocy & Watson LLP; R. Scott Speroff

(57) ABSTRACT

The claimed subject matter provides a system and/or method that facilitates enabling efficient load allocation within an industrial automation environment. A controller with a processing capability can be associated with an industrial automation environment. A balance component can distribute a portion of a load to the controller based upon an evaluation of at least one of the load or the processing capability.

29 Claims, 12 Drawing Sheets

U.S. PATENT DOCUMENTS

| | | | |
|---|---|---|---|
| 2005/0028137 | A1 | 2/2005 | Evans et al. |
| 2006/0005171 | A1 | 1/2006 | Ellison |
| 2006/0041328 | A1 | 2/2006 | McCormick |
| 2006/0150174 | A1 | 7/2006 | Abe et al. |
| 2006/0178757 | A1 | 8/2006 | Grgic et al. |
| 2008/0066019 | A1 | 3/2008 | Worek et al. |
| 2008/0090586 | A1 | 4/2008 | Engelhart |
| 2008/0109471 | A1 | 5/2008 | Subbian et al. |
| 2008/0125877 | A1* | 5/2008 | Miller et al. ............... 700/29 |

OTHER PUBLICATIONS

OA mailed Mar. 20, 2009 for U.S. Appl. No. 11/679,380, 41 pages.
OA mailed Mar. 9, 2009 for U.S. Appl. No. 11/695,758, 33 pages.
OA mailed Mar. 19, 2009 for U.S. Appl. No. 11/733,357, 34 pages.
OA dated Apr. 1, 2009 for U.S. Appl. No. 11/738,787, 32 pages.
OA dated Mar. 20, 2009 for U.S. Appl. No. 11/733,390, 35 pages.
OA dated Oct. 7, 2009 for U.S. Appl. No. 11/679,380, 38 pages.
OA dated Aug. 20, 2009 for U.S. Appl. No. 11/686,406, 31 pages.
OA dated Oct. 19, 2009 for U.S. Appl. No. 11/695,758, 32 pages.
OA dated Aug. 18, 2009 for U.S. Appl. No. 11/738,784, 38 pages.
OA dated Oct. 2, 2009 for U.S. Appl. No. 11/738,787, 22 pages.
OA dated Oct. 19, 2009 for U.S. Appl. No. 11/733,357, 38 pages.
OA dated Oct. 16, 2009 for U.S. Appl. No. 11/733,390, 41 pages.
Foley. "Modify MicroLogix Online." Feb. 2006, A-B Journal, vol. 13, No. 1, abstract, pp. 1-2.
Johnson, et al. "OS Partitioning for Embedded Systems" Feb. 2, 2006; QNX Software Systems, pp. 1-9.
Johnson. Lowering the Development Costs of Industrial Control Systems through Software Partitioning. Aug.15, 2006; QNX Software Systems, pp. 1-9.

\* cited by examiner

DYNAMIC LOAD BALANCING USING VIRTUAL CONTROLLER INSTANCES

TECHNICAL FIELD

The claimed subject matter relates generally to hardware controllers within an industrial automation environment and, more particularly, to optimize the execution of such hardware controllers.

BACKGROUND

Due to advances in computing technology, businesses today are able to operate more efficiently when compared to substantially similar businesses only a few years ago. For example, internal networking enables employees of a company to communicate instantaneously by email, quickly transfer data files to disparate employees, manipulate data files, share data relevant to a project to reduce duplications in work product, etc. Furthermore, advancements in technology have enabled factory applications to become partially or completely automated. For instance, operations that once required workers to put themselves proximate to heavy machinery and other various hazardous conditions can now be completed at a safe distance therefrom.

Further, imperfections associated with human action have been minimized through employment of highly precise machines. Many of these factory devices supply data related to manufacturing to databases that are accessible by system/process/project managers on a factory floor. For instance, sensors and associated software can detect a number of instances that a particular machine has completed an operation given a defined amount of time. Further, data from sensors can be delivered to a processing unit relating to system alarms. Thus, a factory automation system can review collected data and automatically and/or semi-automatically schedule maintenance of a device, replacement of a device, and other various procedures that relate to automating a process.

While various advancements have been made with respect to automating an industrial process, utilization and design of controllers have been largely unchanged. In more detail, industrial controllers have been designed to efficiently undertake real-time control. For instance, conventional industrial controllers receive data from sensors and, based upon the received data, control an actuator, drive, or the like. These controllers recognize a source and/or destination of the data by way of a symbol and/or address associated with source and/or destination. More particularly, industrial controllers include communications ports and/or adaptors, and sensors, actuators, drives, and the like are communicatively coupled to such ports/adaptors. Thus, a controller can recognize device identity when data is received and further deliver control data to an appropriate device.

Unfortunately, traditional controllers employed within automation industrial environments have fallen behind recent technological advances to which the automation industry has maintained stride for stride. Conventional controllers are rigid and inflexible such that hardware and/or software associated therewith must be specifically tailored to a particular control engine. Moreover, in relation to industrial automation environments, controllers with executing software and/or programs are dependant and restricted to the specific host controller's available processing capabilities/resources. Traditional techniques and/or mechanisms require a user and/or technician to manually adjust the settings/configurations (e.g., utilizing software and/or hardware tools, etc.) related to the controllers in order to efficiently distribute loads within the industrial environment. Moreover, in order to increase the efficiency in light of the constraints associated with conventional techniques described above, an increase in the amount of controllers is required (e.g., based on typical one-to-one ratios for controllers and loads) which can be costly, inefficient, counter-productive, and meticulous.

SUMMARY

The following presents a simplified summary of the claimed subject matter in order to provide a basic understanding of some aspects described herein. This summary is not an extensive overview, and is not intended to identify key/critical elements or to delineate the scope of the claimed subject matter. Its sole purpose is to present some concepts in a simplified form as a prelude to the more detailed description that is presented later.

The subject innovation relates to systems and/or methods that facilitate dynamically distributing a load amongst a plurality of controllers. A balance component can receive data related to a load and/or a controller to enable dynamic adjustment of load distribution. The balance component can evaluate data associated with a load within an industrial automation environment and/or a controller within the industrial automation environment in order to allocate a portion of the load to one or more controllers to optimize performance. Conventional and traditional techniques require manual configuration and/or adjustment of controllers or the addition of more controllers to allow effective load distribution. The balance component, as described in the subject innovation, can self-adjust distribution of a portion of the load within the industrial automation environment in real-time without user intervention.

Moreover, the balance component can allocate a portion of the load to a controller, a remote controller, a controller engine instance hosted on a controller, a remote controller engine instance, a distributed controller engine instance, and/or most any suitable combination thereof. For instance, the balance component can enable communication of data between the controllers, remote controllers, controller engine instances, remote controller engine instance, distributed controller engine instance, etc. which can allow available resources to be effectively identified. Thus, a controller can communicate that a portion of resources and/or capabilities can be utilized to handle/manage an additional portion of the load. Based on such data communication, the balance component can shift a portion of a load from one controller to the controller that has available processing power.

In another aspect in accordance with the subject innovation, the balance component can utilize a trend component to facilitate in identifying optimal load distribution and/or allocation. The trend component can receive data and/or historic data associated with the industrial automation environment, a controller, a controller engine instance, a load, a load performance on a particular controller, a remote controller, etc., wherein the trend component can extrapolate a tendency and/or pattern. Such pattern and/or tendency can be utilized by the balance component to continuously and dynamically allocate a portion of the load within the industrial automation environment. In other aspects of the claimed subject matter, methods are provided that facilitates evaluating a portion of a load to allocate to at least one controller within an industrial environment.

To the accomplishment of the foregoing and related ends, certain illustrative aspects of the claimed subject matter are described herein in connection with the following description and the annexed drawings. These aspects are indicative, however, of but a few of the various ways in which the principles of the claimed subject matter can be employed and such subject matter is intended to include all such aspects and their equivalents. Other advantages and novel features will become apparent from the following detailed description of the invention when considered in conjunction with the drawings.

DETAILED DESCRIPTION

Figure 1:
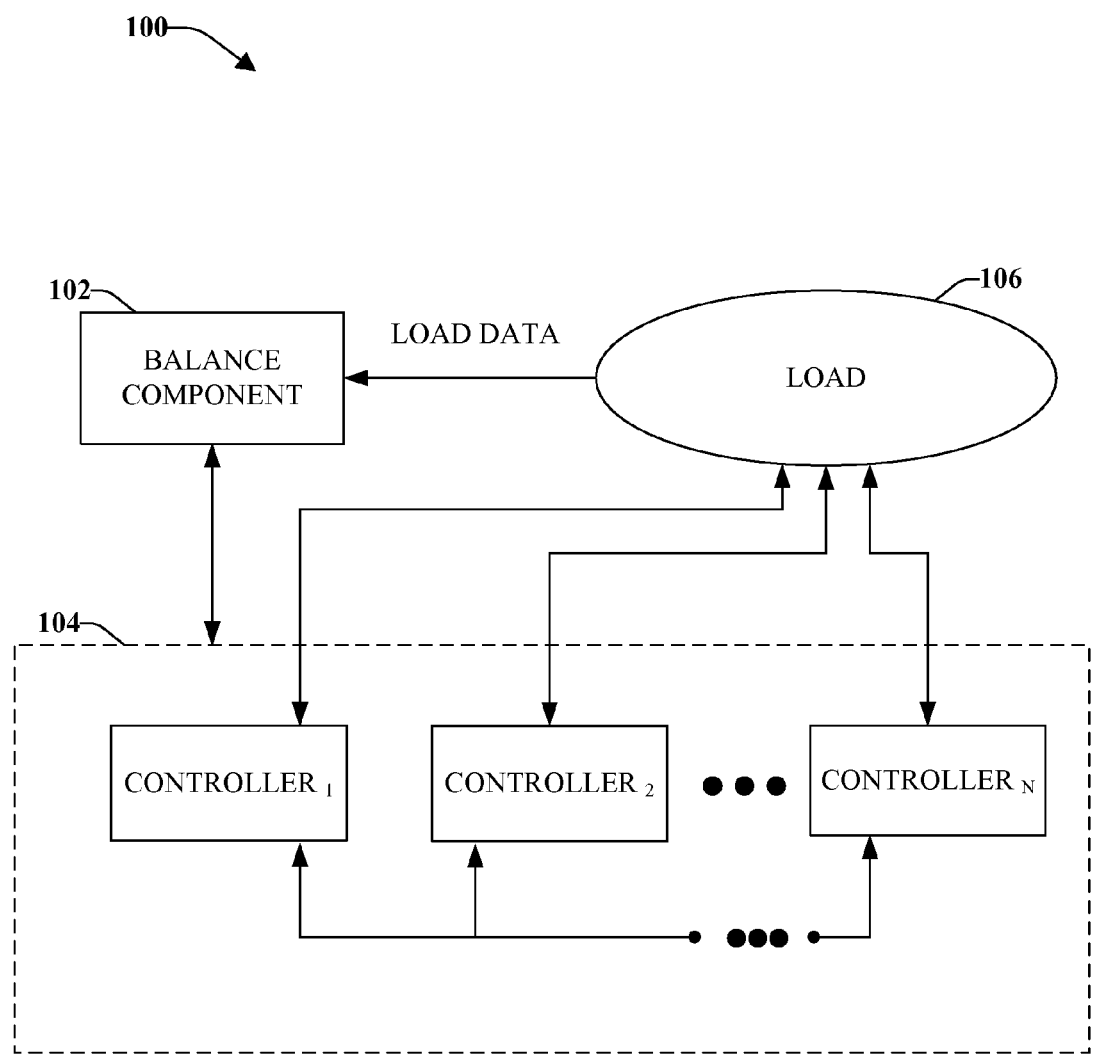
FIG. 1 illustrates a block diagram of an exemplary system that facilitates dynamically distributing a load amongst a plurality of controllers.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that such matter can be practiced without these specific details. In other instances, well-known structures and devices are shown in block diagram form in order to facilitate describing the invention.

As used in this application, the terms "component," "controller," "load," and "system" are intended to refer to a computer-related entity, either hardware, a combination of hardware and software, software, or software in execution. For example, a component may be, but is not limited to a process running on a processor, a processor, an object, an executable, a thread of execution, a program, and a computer. By way of illustration, both an application running on a server and the server can be a component. One or more components may reside within a process and/or thread of execution and a component may be localized on one computer and/or distributed between two or more computers. The word "exemplary" is used herein to mean serving as an example, instance, or illustration. Any aspect or design described herein as "exemplary" is not necessarily to be construed as preferred or advantageous over other aspects or designs.

Furthermore, aspects of the claimed subject matter may be implemented as a method, apparatus, or article of manufacture using standard programming and/or engineering techniques to produce software, firmware, hardware, or any combination thereof to control a computer to implement various aspects of the subject invention. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., card, stick, key drive, etc.). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of what is described herein.

Now referring to the drawings, FIG. 1 illustrates a system 100 that facilitates dynamically distributing a load amongst a plurality of controllers. The system 100 can include a balance component 102 that can employ dynamic allocation of a portion of a load 106 to one or more controllers 104 without user intervention. Generally, the balance component 102 can adjust a load assignment (e.g., load A is assigned to controller X, load B is assigned to controller Y, etc.) for controllers 104 within an industrial automation environment. Moreover, the balance component 102 can allow the distribution of most any suitable portion of the load 106 to most any suitable portion of the controllers 104. For example, the load 106 can be partitioned into five (5) parts with five (5) controllers handling/controlling each part. In another example, the load 106 can be divided into four (4) pieces where a controller A can handle/control 2 pieces, controller B can handle/control 1 piece, and controller C can handle/control 1 piece. It is to be appreciated that the load 106 can be partitioned and/or distributed based on most any suitable manner such as, but not limited to, percentage based, functionality, importance, priority, security, location, source/origin, user preference, user-defined manner, relation to source code, etc. Furthermore, it is to be appreciated that the balance component 102 can distribute a portion of the load 106 to most any suitable number of controllers 104 such as controller$_1$, controller$_2$ to controller$_N$, where N is a positive integer. Although a single balance component 102 is depicted, it is to be appreciated and understood that most any suitable number of balance components can be employed such that the balance component can be within each controller, a stand-alone component, and/or most any suitable combination thereof.

In one particular example, the balance component 102 can receive data related to the load 106, wherein the balance component 102 can evaluate such load 106 in order to ascertain an optimal distribution between and/or amongst the controllers 104 without user intervention. In another specific example, the balance component 102 can identify and/or monitor the controllers 104 such that the processing power, capabilities, and/or resources can be utilized to base the apportioning of the load 106 therewith. By evaluating at least one of the load 106 and/or the controllers 104, the balance component 102 can enable self-tuning and/or dynamic distribution which optimizes and enhances controllers within industrial automation environments. Controllers within industrial automation environments typically have various characteristics and/or capabilities in relation to computation and/or processing ability. By evaluating such characteristics and/or the load 106, the system 100 greatly improves traditional techniques and/or mechanisms associated with controllers. It is to be appreciated that the load 106 can be most any suitable load related to an industrial environment such as, but not limited to, control related to a portion of a device within the industrial environment, control related to a portion of a process within the industrial environment, receipt of data related to the industrial environment, transmission of data related to the industrial environment, most any suitable processing within the industrial environment, etc.

It is to be appreciated that the controllers 104 can contain software components and hardware components having inputs and/or outputs that can be utilized in connection with automating an industrial manufacturing device/process. Moreover, it is to be appreciated and understood that the controllers 104 can be most any suitable portion of hardware and/or portion of software that receives and/or transmits inputs and/or outputs in order to control at least one of the load 106, a device, or a portion of a process. It is to be noted that a controller (e.g., a programmable logic controller (PLC), etc.) can be a dedicated piece of hardware that is self contained or in the case of a "soft PLC" a piece of software that runs on a computer and provides PLC-like control. For instance, in the case of a soft PLC, the load 106 can be distributed to multiple soft PLCs and/or soft PLC engines associated with an industrial automation environment, wherein each soft PLC and/or the soft PLC engine can handle a portion of the load 106.

It is to be noted that the controllers 104 can include various computer or network components such as servers, clients, communications modules, mobile computers, wireless components, control components and so forth that are capable of interacting across a network (not shown). Similarly, the term PLC or controller as used herein can include functionality that can be shared across multiple components, systems, and or networks. For example, one or more controllers 104 (e.g., PLCs, etc.) can communicate and cooperate with various network devices across a network. This can include substantially any type of control, communications module, computer, I/O device, sensor, Human Machine Interface (HMI)) that communicate via a network which includes control, automation, and/or public networks. The controllers 104 can also communicate to and control various other devices such as Input/Output modules including Analog, Digital, Programmed/Intelligent I/O modules, other programmable controllers, communications modules, sensors, output devices, and the like.

A network can include public networks such as the Internet, Intranets, and automation networks such as Control and Information Protocol (CIP) networks including DeviceNet and ControlNet. Other networks include Ethernet, DH/DH+, Remote I/O, Fieldbus, Modbus, Profibus, wireless networks, serial protocols, and so forth. In addition, the network devices can include various possibilities (e.g., hardware and/or software components). These include components such as switches with virtual local area network (VLAN) capability, LANs, WANs, proxies, gateways, routers, firewalls, virtual private network (VPN) devices, servers, clients, computers, configuration tools, monitoring tools, and/or other devices.

In another aspect in accordance with the subject innovation, the controllers 104 can be implemented in the industrial automation environment (e.g., an industrial environment, an automation environment, an environment, an automation industry, etc.) which employs a hierarchical representation of devices and/or processes. The hierarchy can be based at least in part upon the physical location of devices/processes (e.g., a region of a factory can have several defined sub-regions, which in turn can comprise sub-regions), standards associated with industry, such as ISA, S95, ISA S88, and the like, proprietary hierarchy that is provided by an enterprise, or any other suitable hierarchy (discussed in further detail in FIG. 10). It is to be appreciated that the controller software can be distributed as a component of a disparate application (e.g., a larger application). For instance, a controller component can be included on a welder (e.g., a robot welder, an automated welder, etc.), wherein the controller can execute within the context of the welder (e.g., executing within the context of the robot welder).

Figure 2:
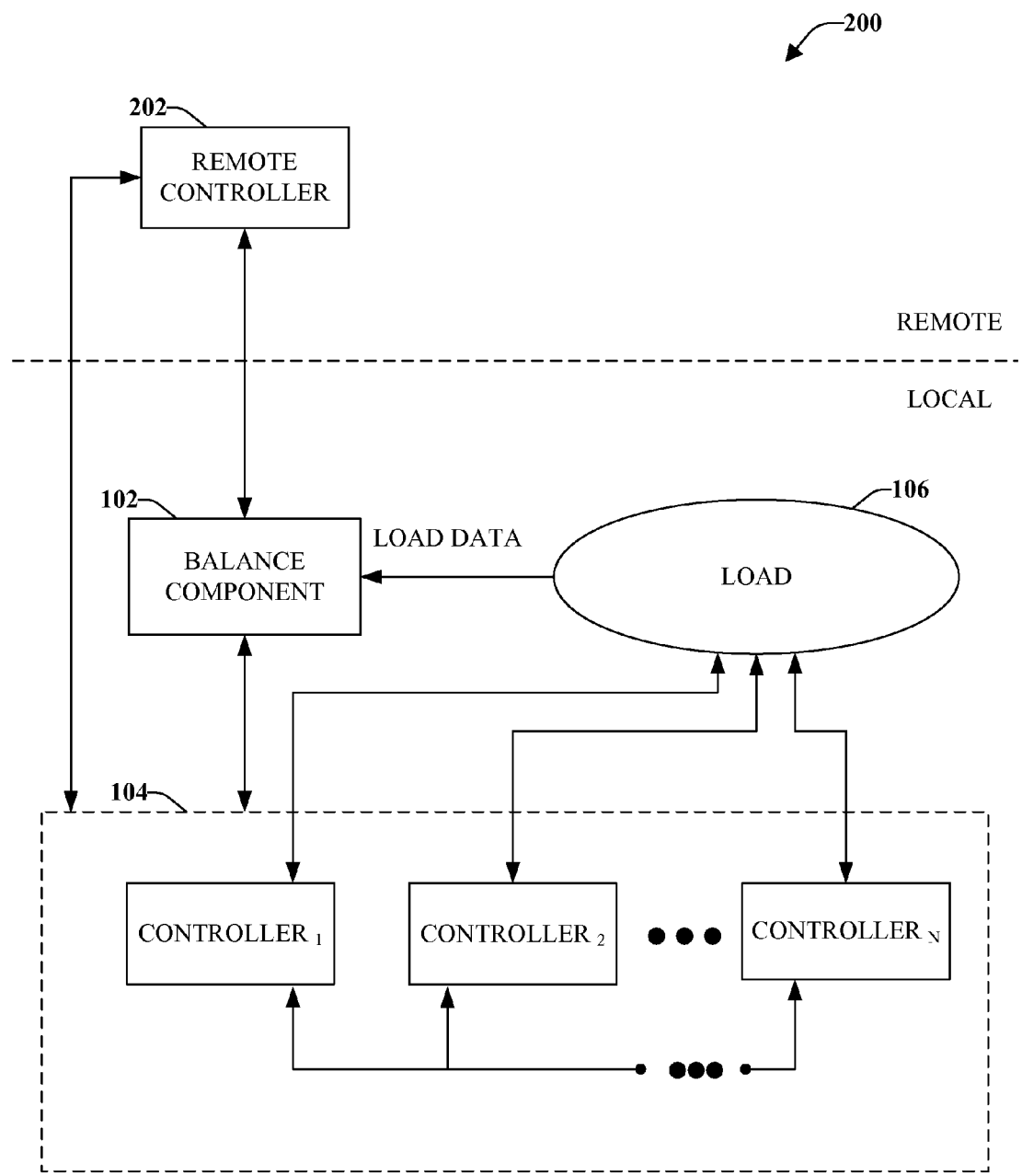
FIG. 2 illustrates a block diagram of an exemplary system that facilitates optimally partitioning a load between at least two or more controllers locally and/or remotely based at least in part upon controller processing power/resources.

FIG. 2 illustrates a system 200 that facilitates optimally partitioning a load between at least two or more controllers locally and/or remotely based at least in part upon controller processing power/resources. The system 200 can include the balance component 102 that enables self-tuning and/or adjusting of various loads within an industrial automation environment across one or more controller 104. The balance component 102 can evaluate the load 106 and/or characteristics associated with controllers 104, wherein a portion of the load 106 can be disseminated to the controllers 104 to handle, control, execute, etc. based at least in part upon the evaluation. For instance, the balance component 102 can monitor and/or track most any suitable characteristic associated with the capability of the controllers 104 such as, but not limited to, processing ability, hard drive, processor speed, memory, networking capabilities, version, edition, hardware age, processor type, controller brand, controller functionality, controller make, controller model, available resources, capacity available, accessibility, frequency of use, processor consumption, memory consumption, etc.

It is to be appreciated that the balance component 102 can distribute a portion of the load 106 to most any suitable controller such as the controllers 104, a local controller, a remote controller 202, and/or most any suitable combination thereof. For instance, the balance component 102 can ascertain that additional processing power/resources are necessary. The balance component 102 can utilize the remote controller 202 to handle/control a portion of the load 106. Although a single load and/or a single remote controller is illustrated, it is to be appreciated that such depiction is for the sake of brevity and the subject innovation can include most any suitable number of loads and/or remote controllers.

Furthermore, it is to be appreciated that communication between most any suitable controllers handling/controlling a portion of the load 106 can be employed. Thus, the controllers 104 and/or the remote controller 202 can communicate to each other in relation to the distribution of the load 106 therewith. Moreover, it is to be understood that the communication can be among most any suitable controller associated with the system 200 and the communication need not be between controllers sharing the load 106. Thus, a system can include controller A, controller B, and controller C such that a load is shared by controller A and controller B (e.g., no load on controller C, a disparate load on controller C, etc.). Controller C can communicate to controller A and/or controller B to notify of available processing resources/capabilities to which a portion of the load can then be shared by controller C. Furthermore, it is to be appreciated that the balance component 102 can receive such communications and re-distribute the allocation of the load 106 accordingly in real-time.

Figure 3:
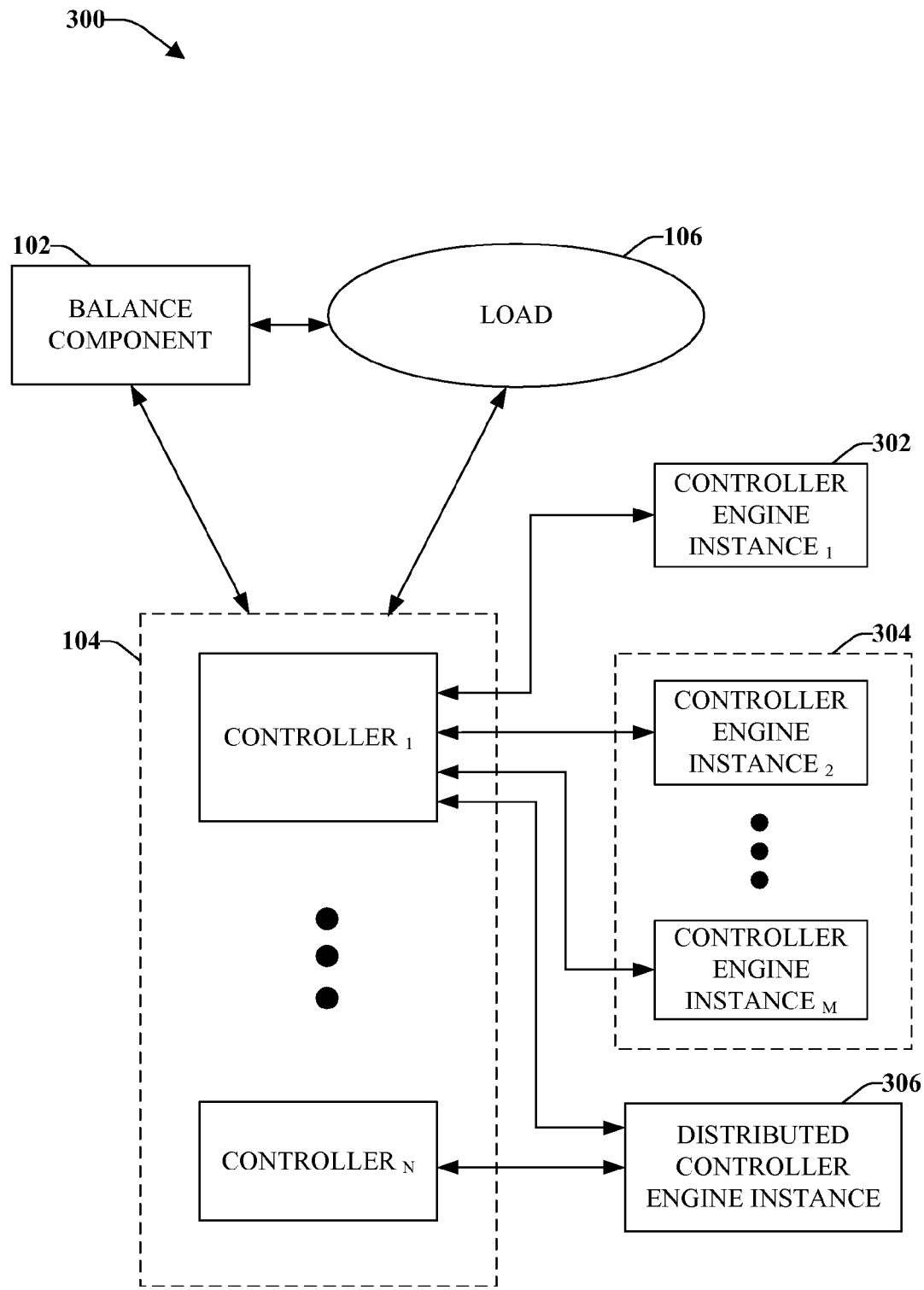
FIG. 3 illustrates a block diagram of an exemplary system that facilitates allocating a portion of a load to at least one controller engine instance executing on a controller.

FIG. 3 illustrates a system 300 that facilitates allocating a portion of a load to at least one controller engine instance executing on a controller. The system 300 can include the controllers 104 that can host at least one controller engine instance 302, wherein the controller engine instance 302 can execute on at least one controller to handle a portion of the load 106 within an industrial automation environment. The controllers 104 can utilize most any suitable number of controller engine instances 304 such as controller engine instance$_1$, controller engine instance$_2$, to controller engine instance$_M$, where M is a positive integer. In other words, at least one controller can implement a plurality of controller engine instances (e.g., controller engine instance 302), wherein each controller engine instance can handle/control a portion of the load 106 within the industrial automation environment. Thus, the balance component 102 can evaluate at least one of the load 106, one or more controllers 104, or a controller engine instance such that the load 106 can be dynamically allocated to at least one of the controllers 104 or a controller engine instance.

The system 300 can include most any suitable number of controllers 104 such as controller$_1$ to controller$_N$, where N is a positive integer. Each controller can utilize respective controller engine instances that execute thereupon, wherein each controller engine instance can handle a portion of the load 106. For example, a controller can host the controller engine instance$_1$ and/or the plurality of controller engine instances 304 (e.g., such as controller engine instance$_1$ to controller engine instance$_M$, where M is a positive integer). Similarly, the controller$_N$ can employ/utilize/host one or more controller engine instances (not illustrated for the sake of brevity). Still further, it is to be appreciated that the controller$_1$ and the controller$_N$ can utilize a distributed controller engine instance 306, wherein the distributed controller engine instance 306 executes on at least a portion of the controller$_1$ or a portion of the controller$_M$. Although a single distributed controller engine instance 306 is illustrated, it is to be understood that there can be most any suitable number of controller engine instances distributed to most any suitable number of controllers within an industrial automation environment. Generally, it is to be understood that the balance component 102 can distribute a portion of the load to a controller, a controller engine instance, a remote controller, a remote controller engine instance, a distributed controller engine instance, a remote distributed controller engine instance, and/or most any suitable combination thereof.

In another example, a controller engine instance executing on a first controller can be seamlessly handed off to a disparate controller based upon a deterioration of the initial hosting controller (e.g., first controller). Furthermore, the controller engine instance can be shared and/or distributed to a disparate controller in light of a possible deterioration and/or problematic initial host controller. It is to be appreciated that the claimed subject matter is to include transferring, handing off, sharing, etc. of a controller engine instance to a disparate controller based on a particular event/circumstance (e.g., controller health, controller characteristic, restructure, update, security, upgrade, error, firmware, dependability, detail related to an industrial automation environment, etc.). In addition, a portion of the load 106 can be seamlessly transferred and/or handed off to at least one of a disparate controller, a disparate controller engine instance, a remote controller, a remote controller engine instance, and/or most any suitable combination thereof. Moreover, the transfer and/or hand off can be based at least in part upon the health and/or deterioration of a controller (e.g., remote, local, etc.) and/or a controller engine instance (e.g., remote, local, etc.). The transfer and/or hand off can further be based in part upon a particular event/circumstance (e.g., controller health, controller characteristic, restructure, update, security, upgrade, error, firmware, dependability, detail related to an industrial automation environment, etc.).

The system 300 can further utilize a manager component (not shown) that can evaluate at least one of the load 106 or the industrial environment to ascertain an amount of controller engine instances to generate/spawn in order to handle the load 106 associated with the controllers 104. Moreover, the manager component can provide data related to the generated controller engine instances to the balance component 102 in order to distribute a portion of the load 106 thereto. Particularly, the manager component can receive data associated with the industrial environment (e.g., device data, process data, controller data, controller load data, data related to the industrial environment, etc.), wherein the manager component can identify an adequate amount of controller engine instances to generate and/or create based at least in part upon the received data. Upon the creation and/or spawning of the amount of controller engine instances, the balance component 102 can evaluate/identify the engine instances created and allocate the load 106 to at least one of a controller, a controller engine instance, a remote controller, a remote controller engine instance, and/or any combination thereof.

It is to be appreciated that the manager component can base the generation of controller engine instances upon the load 106 associated with the industrial environment to which the instances are to execute. However, it is to be understood that the manager component can identify the amount of controller engine instances and/or the assignment of the controller engine instances on most any suitable data related to the industrial environment, a pre-defined amount/assignment, a dynamically adjustable amount/assignment, and/or any combination thereof. For instance, the manager component can determine the amount of controller engine instances to spawn based on the type, make, model, brand, etc. of the host controller. In another example, the manager component can ascertain the assignment of the controller engine instance based on a characteristic of the load 106 (e.g., plant location, security level, functionality, importance, priority, device model, historical data on performance with controller engine instances, etc.). It still another example, the manager component can utilize historic data (e.g., stored in the data store discussed below) in order to fine tune and/or adjust the generation/assignment of controller engine instances to carry and/or handle the load 106. For instance, based on previous trials, a particular brand of controller may only handle three controller engine instances that suite well for a particular load and the manager component can employ such data accordingly for future implementation.

Figure 4:
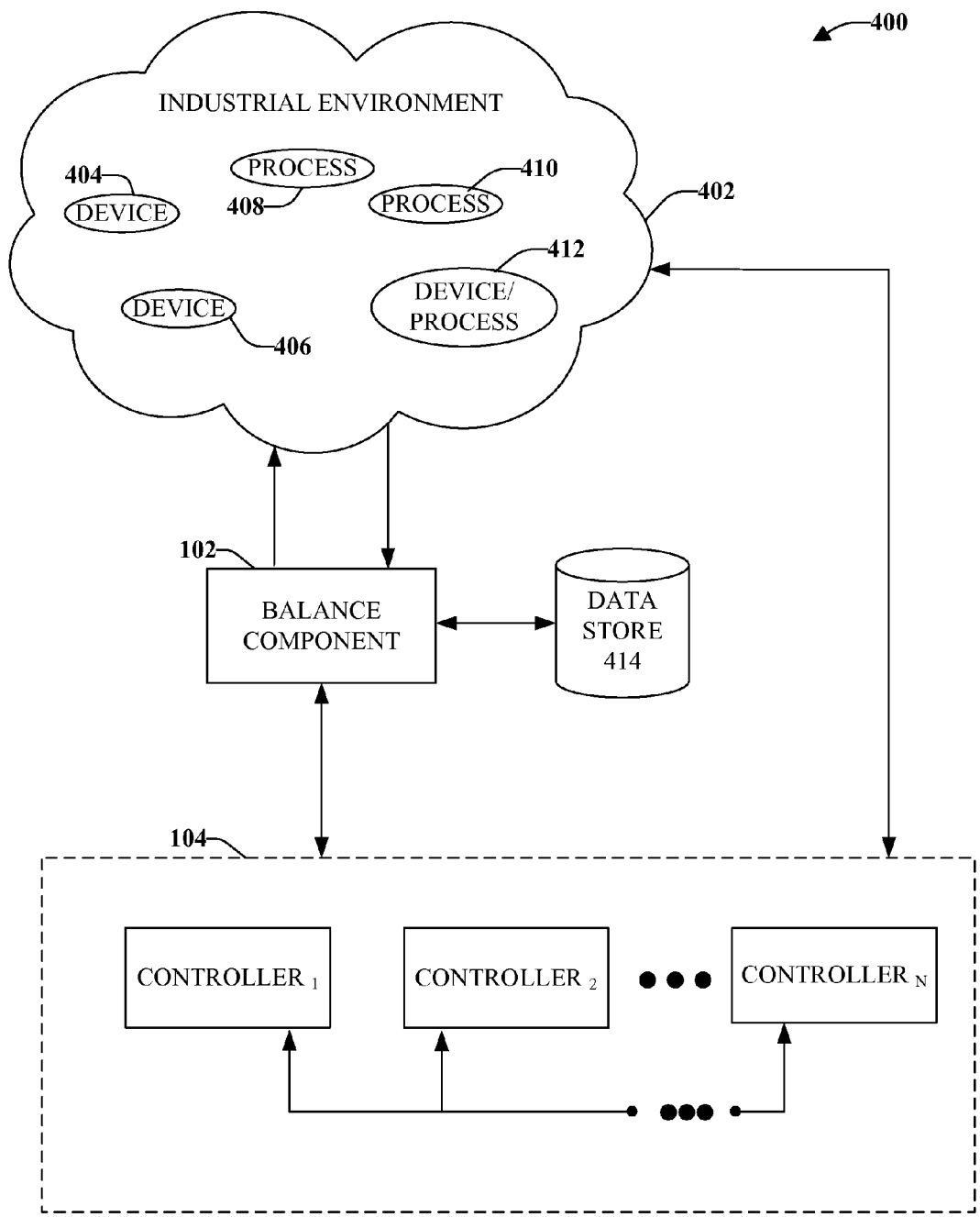
FIG. 4 illustrates a block diagram of an exemplary system that facilitates evaluating a portion of a load to allocate to at least one controller within an industrial environment.

FIG. 4 illustrates a system 400 that facilitates evaluating a portion of a load to allocate to at least one controller within an industrial environment. The system 400 can include the balance component 102 that can evaluate at least one of an industrial environment 402 or one or more controllers 104 to enable dynamic load balancing, wherein the load can be associated with at least one device, process, entity, and/or most any suitable combination thereof within the industrial environment 402. For example, the industrial environment 402 can include most any suitable number of devices and/or process such as device 404, device 406, process 408, process 410, and/or device/process 412. It is to be appreciated that the devices and/or process within the industrial environment 402 can be communicatively coupled to the system 400 by way of an intranet or other suitable network. The device can be most any suitable device associated with an industrial automation environment such as, but not limited to, a physical device, a software device, an application, a virtual device, a PLC, a controller device, a furnace, a human machine interface (HMI), a computer, a disparate controller, a roller, a station, a welder, a scanner, a belt conveyor, a pump, a press, a fan, a heater, a switch, a sensor, a conveyor, a portion of firmware, a portion of an application, a portion of a process, a cooler, a valve, an electrical component, a drain, a photo eye, etc. Furthermore, a portion of the device and/or process can be controlled by the controllers 104, a controller engine instance (not shown), a portion of a controller engine instance (not shown), and/or most any suitable combination thereof.

It is to be appreciated that the system 400 can be utilized in a hierarchically structured industrial environment. For example, the devices/processes 404-412 can be hierarchically structured to facilitate management of such devices within the industrial environment 402. The hierarchy can be based at least in part upon the physical location of devices (e.g., a region of a factory can have several defined sub-regions, which in turn can comprise sub-regions), standards associated with industry, such as ISA, S95, ISA S88, and the like, proprietary hierarchy that is provided by an enterprise, or any other suitable hierarchy. For instance, a top portion of the hierarchy may be a plant, and a sub-level of the plant may be programmable logic controllers utilized within the plant, and a sub-level of the programmable logic controllers can be devices controlled by such controllers. It is understood that this is but one example of a hierarchy, and is for illustrative purposes only.

Moreover, the system 400 can include a data store 414 that can store data related to a load, the controllers 104, the industrial environment 402, historic data associated with the industrial environment, historic data associated with the controllers 104, assignment of controllers, load distribution, scheduling of load assignment, transfer of loads, characteristics associated with load assignments, controller engine instance generation, historic data related to controller engine instance assignment, controller data, controller engine instance data, assignment data, configuration data related to controllers, controller settings, controller engine instance settings, load data related to a controller, most any suitable data related to a controller, load, environment, and/or a controller engine instance, health data related to a controller, transfer data, distribution data, etc.

The data store 414 can be, for example, either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable programmable ROM (EEPROM), or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM). The data store 414 of the subject systems and methods is intended to comprise, without being limited to, these and any other suitable types of memory. In addition, it is to be appreciated that the data store 414 can be a server, a database, a hard drive, and the like.

Generally, the system 400 can provide dynamic self-tuning of load distribution within the industrial environment 402. Specifically, the load of applications, devices, programs, processes, portions of the like, and/or most any suitable combination thereof can be continuously and dynamically allocated to one or more controllers 104. For instance, industrial control systems (e.g., substantially similar to the industrial environment 402) can include physical industrial controllers executing a portion of a user program. The execution of the user programs can be dependant on the available processing power of the physical industrial controller. Typically, to balance the loading of program execution among controllers in a system, a user must manually make changes to the environment. Thus, traditional and conventional systems required human intervention to dynamically balance the execution of an industrial control system. However, by utilizing the balance component 102, the system 400 can dynamically balance the load associated with the industrial environment 402 based on at least the controllers 104 and/or evaluation of the load. Moreover, the system 400 can increase the efficiency of the industrial control system with minimal human interaction. The controllers 104 can communicate among one another and/or with the balance component 102 to ascertain the optimal load balance therewith. It is to be appreciated that the determination can be made based at least in part upon evaluations of the controllers 104, the load, the industrial environment 402, real-time data, trend data of past system execution, most any suitable data related to at least one of the industrial environment 402, the load(s), and/or the controllers 104, etc.

In another example, the system 400 can utilize virtual industrial controllers. A virtual industrial controller can be constructed when one instance of an executing industrial control engine is replaced by another executing industrial control engine (e.g., a seamless hand-off, a hand-off, etc.). It is to be appreciated that the controller instance can execute a control engine on a designated hardware platform. Moreover, multiple controller instances can be more than one instance of a control engine executing on one designated hardware platform. The identity of the originating control engine can be assumed by the virtual control engine. For example, a portion of a user program executing within the originating controller can be transferred to the virtual control engine at a time specified by the originating controller. Moreover, virtual controllers can exist on the same physical designated hardware platform as the original controller instance. In addition, a virtual controller can exist on a remote designated hardware platform away from the original controller instance.

In another example, physical controllers can be grouped, wherein such controllers can communicate with each other. As the control system executes each of the industrial controllers can have a unique amount of processing power based on user program and most any application executing. With the industrial control system executing, a portion of a load on a physical industrial controller can be transferred to other physical industrial controllers in the system. For instance, one industrial controller in the system can manage the system load balancing functionality (e.g., incorporating the balance component 102 into a controller). User programs would not need to be modified to compensate for virtual controllers. Moreover, the industrial control system can dynamically tune itself for optimal load balancing utilizing real-time data along with trend data gathered over a period of time. It is to be appreciated that the controller software can be distributed as a component of a disparate application (e.g., a larger application). In other words, the control application can be executing as a component of a larger system such that the load associated therewith can be balanced accordingly.

Figure 5:
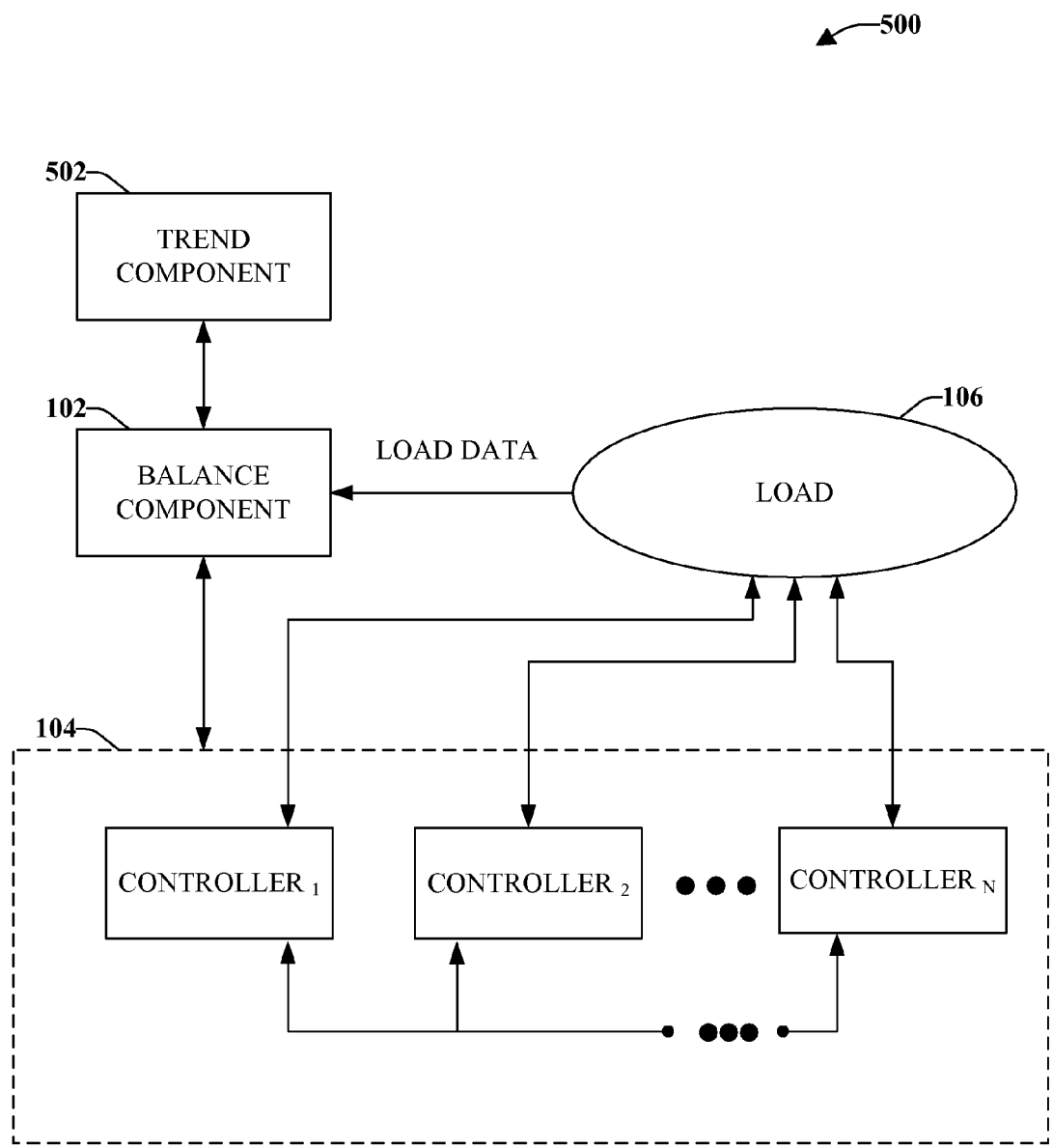
FIG. 5 illustrates a block diagram of an exemplary system that facilitates continuously adjusting load distribution between a plurality of controllers based at least in part upon trend analysis in real-time.

FIG. 5 illustrates a system 500 that facilitates continuously adjusting distribution between a plurality of controllers based at least in part upon trend analysis in real-time. The system 500 can include the balance component 102 that can dynamically allocate the load 106 and/or a portion of the load 106 to one or more controllers 104 in order to optimize processing capabilities, resources, power, etc. associated therewith. In particular, the balance component 102 can receive at least one of load data associated with the load 106 and/or controller data related to one or more controllers 104, wherein the balance component 102 can continuously distribute the load 106 to the controllers 104 based at least in part upon the received data (e.g., load data, controller data, etc.). Moreover, the balance component 102 can distribute the load 106 to at least one of a portion of a controller, a remote controller, a controller engine instance (discussed supra), more than one controller, most any suitable combination thereof, etc.

Furthermore, the balance component 102 can utilize a trend component 502 to assign a portion of the load 106 to a portion of a controller. The trend component 502 can receive data associated with at least one of an industrial environment, a device, a process, an application, a portion of a process, a controller, a characteristic of a controller (e.g., processor data, memory data, storage data, location, availability, etc.), and/or most any suitable data related to the system 500. Based on such received data, the trend component 502 can extrapolate trends and/or tendencies associated with the environment/system associated with the load 106. Moreover, the trend component 502 can identify and/or infer such trends, tendencies, patterns, sequences, and the like in order to facilitate the balance component 102 in distributing the load 106 to the controllers 104.

For example, the trend component 502 can evaluate data related to the industrial environment such as controller performance data associated with various work shifts during a time period (e.g., 24 hours, 1 week, etc.). The trend component 502 can determine that controller D is handling too much of the distributed load during a portion of the time period. Based on such evaluation from the trend component 502, the balance component 102 can dynamically adjust the distribution of the load for the particular time period in order to alleviate controller D. It is to be appreciated that the trend component 502 can identify a plurality of trends, tendencies, and/or patterns that can be specific to numerous industrial environments and the subject innovation is not so limited to the above example.

Figure 6:
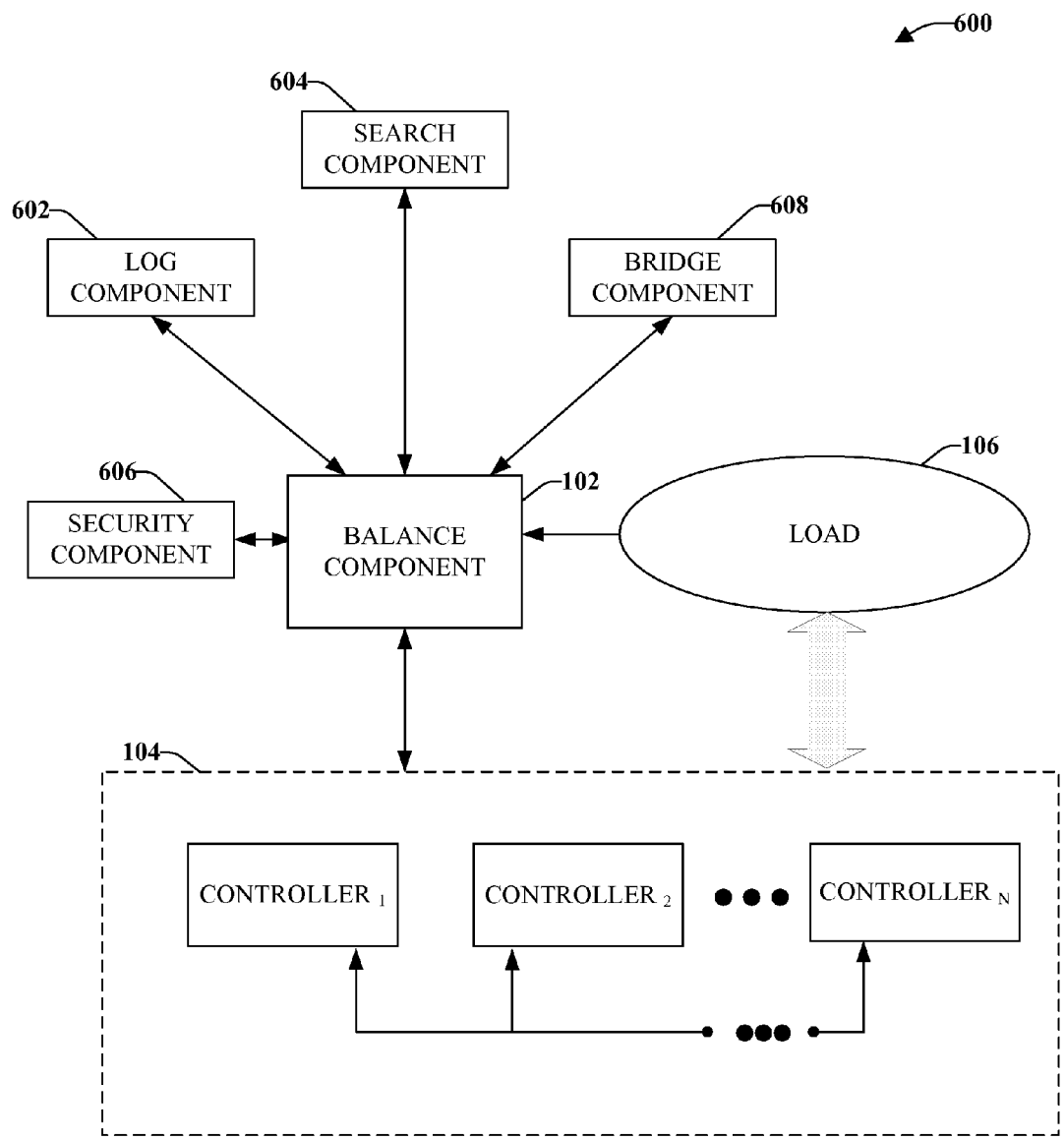
FIG. 6 illustrates a block diagram of an exemplary system that facilitates dynamically balancing loads to controllers within an industrial environment.

FIG. 6 illustrates a system 600 that facilitates dynamically balancing loads to controllers within an industrial environment. The system 600 can include the balance component 102 that can distribute the load 106 to be handled by at least two or more controllers 104 within the industrial environment. By distributing the load 106 amongst the controllers 104, the balance component 102 can ensure an optimized system that utilizes each controller to a maximum potential related to processing capabilities and/or available resources. In other words, the load 106 can be shared between the controllers 104 such that each controller can control and/or manage at least a portion of the load 106. It is to be appreciated that the load 106 need not be distributed among all controllers and that most any suitable amount of controllers can share such load in order to optimize processing power and/or resources associated with such controllers 104.

The system 600 can utilize a log component 602 that tracks data associated therewith. In particular, the log component 602 can track and/or monitor data related to load distribution, load assignment, manipulations related to load assignment, trend data, data associated with manipulated load assignments (e.g., user data, time, date, changes made, controller assignment, location, etc.), time stamps associated with load assignments, controller data, distribution of controller engine instances, security data, hierarchy data, and/or most any suitable data related to the controller, controller engine instance, device, process, etc. It is to be appreciated that the log component 602 can be a stand-alone component, incorporated into the balance component 102, and/or most any combination thereof.

For example, if a user implements the distribution of a load to a controller among controller engine instance A, a controller engine instance B, and a controller engine instance C, the log component 602 can track the user (e.g., via IP address, network address, user name, computer name, etc.), the date and time of load assignment, the engine instances handling which load, the assignments related to the engine instances, the controller partitioned and/or utilized for the instances, etc. The log component 602 can log various aspects related to allocating a portion of the load 106 to the controllers 104 such as, but not limited to, trend data, load data, a portion of code utilized by a controller and/or a controller engine instance, configurations, security data, user names, computer data, network settings/changes, controller location, controller data (e.g., make, model, type, functionality, brand, etc.), etc. Moreover, the log component 602 can store the logged entries in a data store (not shown and discussed supra).

The controller 102 can further utilize a search component 604 that facilitates querying any data associated with the system 600. The search component 604 allows a user and/or any component to query to system 600 in relation to controllers, loads, load assignment, controller engine assignment, controller assignment, controller engine instances, controller engine instances assignment, controller assignment origin, controller engine instance origin, controller engine instance data, controller data within the industrial environment, controller resources, controller processing capabilities, distribution of controller engine instances, applications, portions of code, etc. For instance, a user can query the system 600 utilizing the search component 604 to find a load distributed across a particular group of controllers within the Localville, Ohio plant. In another example, the search component 604 can allow a developer/user/entity (e.g., a computer, a machine, a corporation, a group, an individual, a controller, etc.) to provide all variable names associated with devices within sector 5, cell 6, and controlled by controller engine instance C executing on controller A which handles a portion of a load within an industrial environment. It is to be appreciated that a plurality of searches and/or queries can be implemented by the search component 604 and the above examples are not to be limiting on the claimed subject matter. Moreover, it is to be appreciated that the search component 604 is depicted as a stand-alone component, but the search component 604 can be incorporated into the balance component 102, a stand-alone component, and/or any combination thereof.

The controller 102 can further utilize a security component 606 that provides security to the system 600 to ensure data integrity and/or access in connection with the balance component 102, the controllers 104, the load 106, and/or most any suitable combination thereof. In particular, the security component 606 can define security, authorization, and/or privileges in accordance with at least one of a pre-defined hierarchy, security level, username, password, access rights, data importance (e.g., more important data correlates with high security clearance), etc. For instance, a particular load and/or distribution can be a first security level with distinct security authorizations and/or privileges, while a disparate load and/or distribution can have a second security level with disparate security authorizations and/or privileges. Thus, the security component 606 can provide granular security in relation to loads, controllers, controller engine instances, load assignment/distribution, controller assignment, controller engine instance assignment, controller groupings, controller engine groupings, etc. It is to be appreciated that there can be various levels of security with numerous characteristics associated with each level and that the subject innovation is not limited to the above example. Moreover, the security component 606 provides granular security and/or privileges to the system 600. It is to be appreciated that security component 606 can be a stand-alone component, incorporated into the balance component 102, and/or any combination thereof.

The access component 602 can further include a bridge component 608 that facilitates networking within an industrial automation environment. In other words, the bridge component 608 can act as a network bridge. It is to be appreciated that the bridge component 608 can be a stand-alone component, incorporated into the balance component 102, and/or any combination thereof. Thus, data carried by disparate networks can be manipulated so that it conforms to a common network. Accordingly, the bridge component 608 can recognize a network protocol associated with received instructions related to the balance component 102 and perform operations to convert such data so that it conforms to a pre-defined protocol. Upon such conversion, a mapping can be employed to convert the data so that it conforms to a hierarchically structured data model (rather than data models associated with flat namespaces). The mapping can thereafter provide hierarchically structured data to a requester of such data over a network, wherein the network conforms to the pre-defined protocol. For instance, the first network protocol can be at least one of Fieldbus, Profibus, Hart, Modbus, ASI-bus, and Foundation Fieldbus, while the second network protocol can be a Common Industrial Protocol (CIP).

Figure 7:
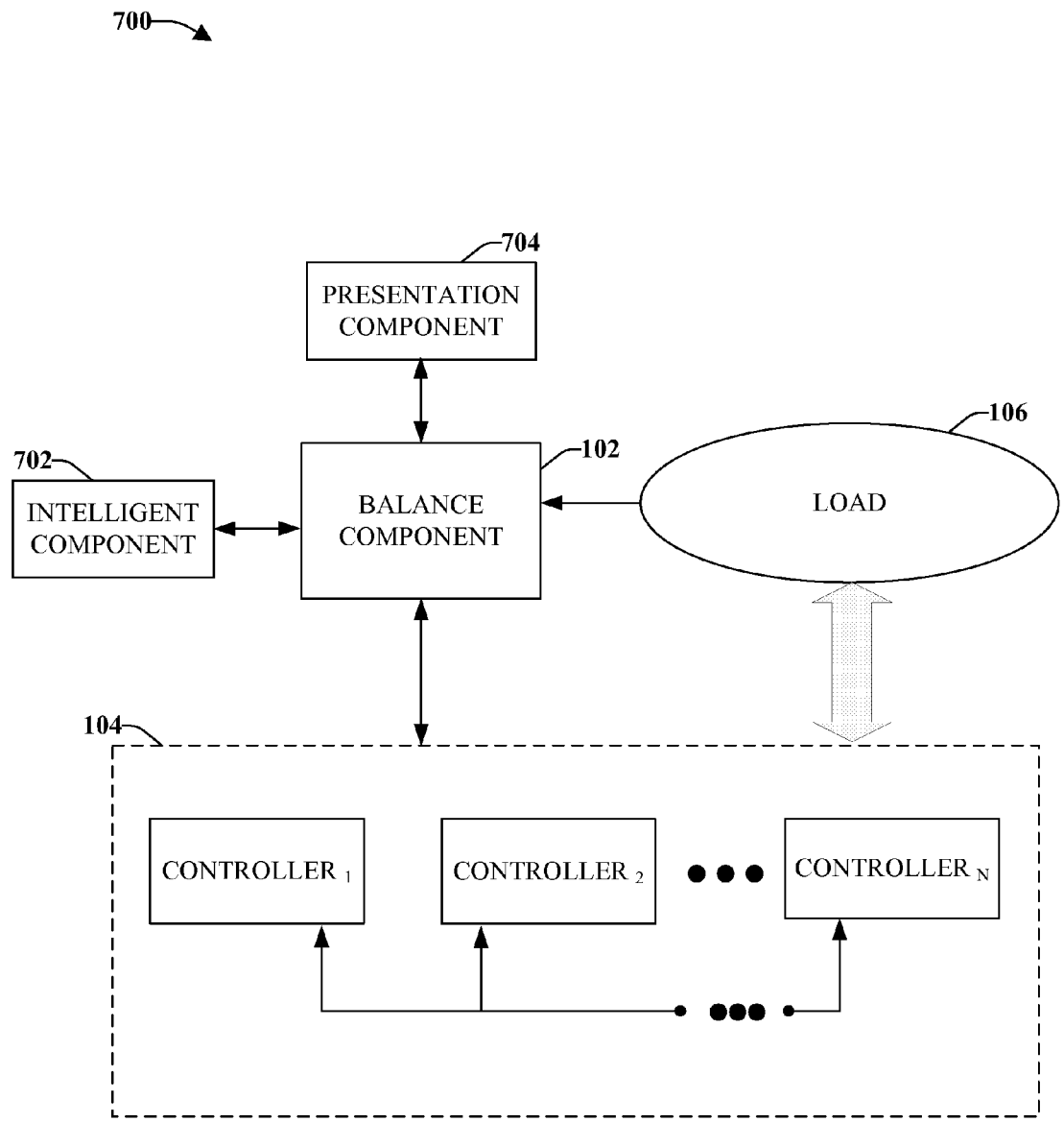
FIG. 7 illustrates a block diagram of an exemplary system that facilitates optimally partitioning a load between at least two or more controllers locally and/or remotely based at least in part upon controller processing power/resources.

FIG. 7 illustrates a system 700 that employs intelligence to facilitate optimally partitioning a load between at least two or more controllers locally and/or remotely based at least in part upon controller processing power/resources. The system 700 can include the balance component 102, the controllers 104, and the load 106 that can all be substantially similar to respective controllers and instances described in previous figures. The system 700 further includes an intelligent component 702. The intelligent component 702 can be utilized by the balance component 102 to facilitate apportioning at least one load between more than one controller for optimal distribution and/or increased efficiency. For example, the intelligent component 702 can infer load amount, self-tuning characteristics/details, data related to self-tuning, load data, load origin, data related to a controller (e.g., controller make, model, brand, type, location, function, etc.), controller resources, controller processing capabilities, data related to a controller engine (e.g., host controller, location, assignment, etc.), data related to controller engine instance, trend data, optimal settings, configurations, adjustment settings, balancing settings, etc.

It is to be understood that the intelligent component 702 can provide for reasoning about or infer states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines . . . ) can be employed in connection with performing automatic and/or inferred action in connection with the claimed subject matter.

A classifier is a function that maps an input attribute vector, $x=(x1, x2, x3, x4, xn)$, to a confidence that the input belongs to a class, that is, $f(x)=confidence(class)$. Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

The presentation component 704 can provide various types of user interfaces to facilitate interaction between a user and any component coupled to the balance component 102. As depicted, the presentation component 704 is a separate entity that can be utilized with balance component 102. However, it is to be appreciated that the presentation component 704 and/or similar view components can be incorporated into the balance component 102, a stand-alone unit, and/or most any suitable combination thereof. The presentation component 704 can provide one or more graphical user interfaces (GUIs), command line interfaces, and the like. For example, a GUI can be rendered that provides a user with a region or means to load, import, read, etc., data, and can include a region to present the results of such. These regions can comprise known text and/or graphic regions comprising dialogue boxes, static controls, drop-down-menus, list boxes, pop-up menus, as edit controls, combo boxes, radio buttons, check boxes, push buttons, and graphic boxes. In addition, utilities to facilitate the presentation such as vertical and/or horizontal scroll bars for navigation and toolbar buttons to determine whether a region will be viewable can be employed. For example, the user can interact with one or more of the components coupled to the balance component 102.

The user can also interact with the regions to select and provide information via various devices such as a mouse, a roller ball, a keypad, a keyboard, a pen and/or voice activation, for example. Typically, a mechanism such as a push button or the enter key on the keyboard can be employed subsequent entering the information in order to initiate the search. However, it is to be appreciated that the claimed subject matter is not so limited. For example, merely highlighting a check box can initiate information conveyance. In another example, a command line interface can be employed. For example, the command line interface can prompt (e.g., via a text message on a display and an audio tone) the user for information via providing a text message. The user can than provide suitable information, such as alpha-numeric input corresponding to an option provided in the interface prompt or an answer to a question posed in the prompt. It is to be appreciated that the command line interface can be employed in connection with a GUI and/or API. In addition, the command line interface can be employed in connection with hardware (e.g., video cards) and/or displays (e.g., black and white, and EGA) with limited graphic support, and/or low bandwidth communication channels. It is to be further appreciated that the presentation component 704 can utilize bio sensing, biometrics (e.g., fingerprints, retinas scan, iris scan, facial patterns, hand measurements, etc.), and the like.

Figure 8:
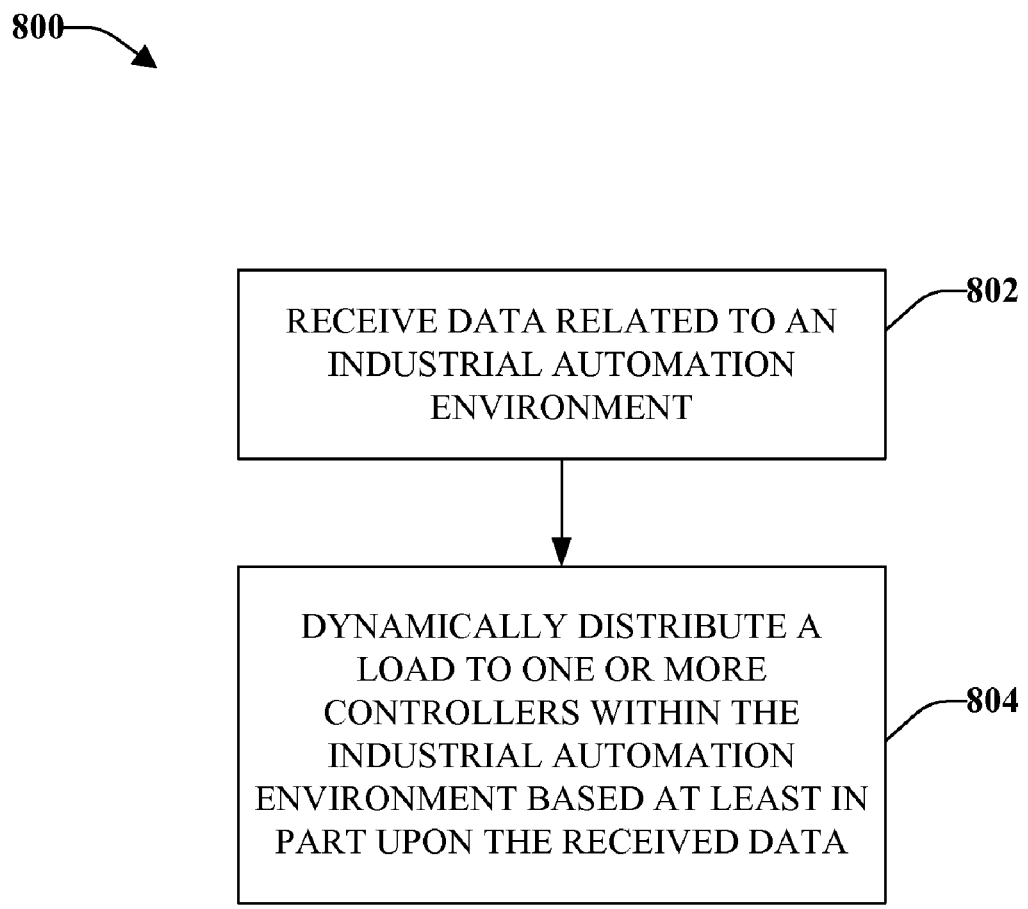
FIG. 8 illustrates an exemplary methodology for dynamically distributing a load amongst a plurality of controllers.
Figure 9:
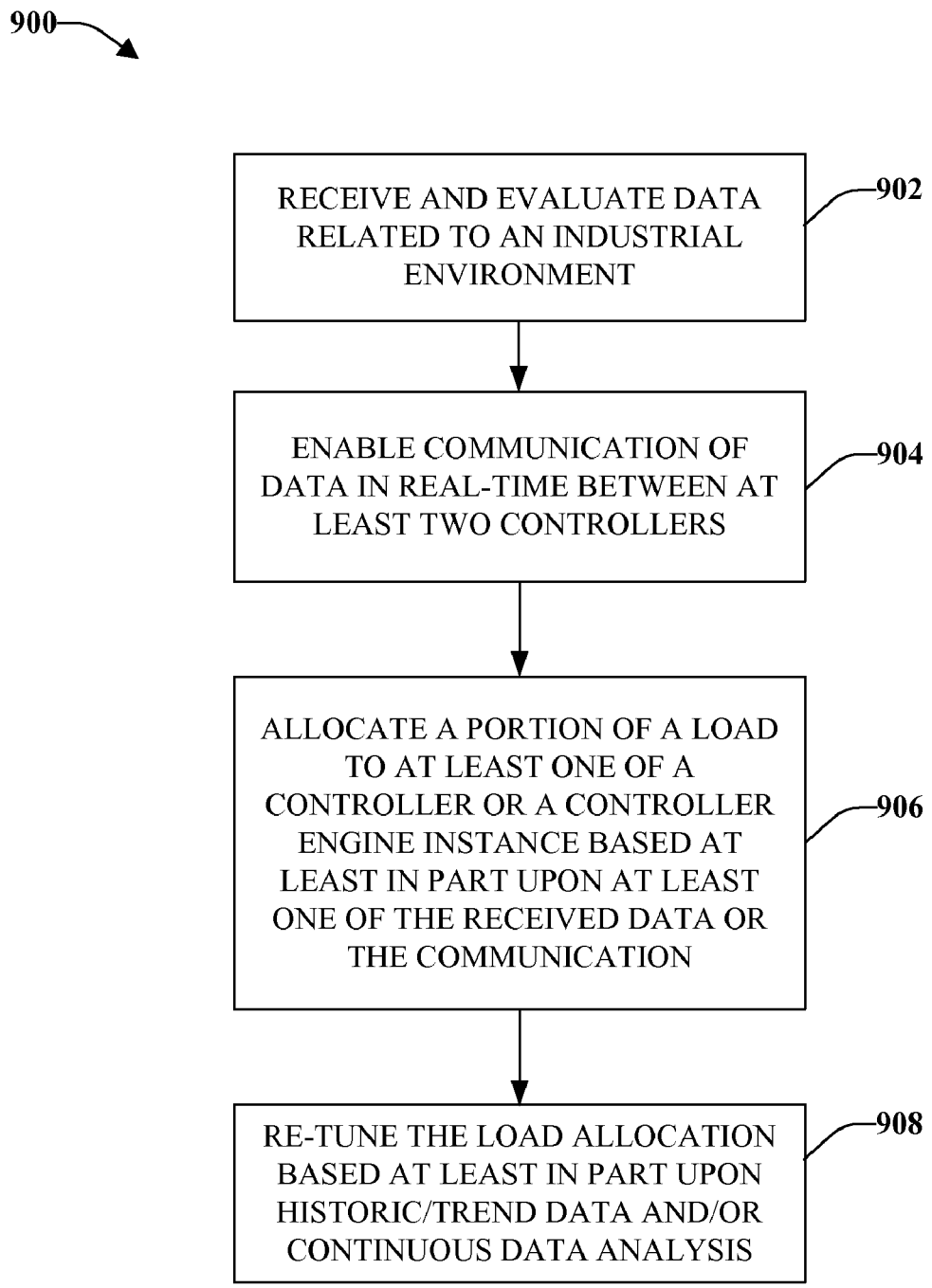
FIG. 9 illustrates an exemplary methodology that facilitates evaluating a portion of a load to allocate to at least one controller within an industrial environment.

Referring to FIGS. 8-9, methodologies in accordance with various aspects of the claimed subject matter are illustrated. While, for purposes of simplicity of explanation, the methodologies are shown and described as a series of acts, it is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

FIG. 8 illustrates a methodology 800 for dynamically distributing a load amongst a plurality of controllers. At reference numeral 802, data related to an industrial automation environment. In particular, the data can be related to at least one of a load within the industrial automation environment, a controller within the industrial automation environment, a remote controller, a controller engine instance, a remote controller engine instance, trend data associated with a load, historic data associated with the load, and/or most any suitable data associated with the load. For instance, data associated with a controller within a particular industrial environment can be received, wherein such data can be controller processing capabilities, controller resources, controller load assignment, etc. It is to be appreciated that the load can be most any suitable load related to an industrial environment such as, but not limited to, control related to a portion of a device within the industrial environment, control related to a portion of a process within the industrial environment, receipt of data related to the industrial environment, transmission of data related to the industrial environment, most any suitable processing within the industrial environment, etc.

At reference numeral 804, a load can be dynamically distributed to one or more controllers within the industrial automation environment based at least in part upon the received data. In other words, a portion of the load can be dynamically shared and/or distributed to a plurality of controllers in order to optimize the controller resources and/or capabilities. For example, the received data (e.g., controller data, load data, trend data, historic data, controller engine instance data, data related to the industrial automation environment, etc.) can be evaluated in order to optimally share the load amongst at least one or more controllers and/or controller engine instances. For example, a load can be evaluated to ascertain that a controller assignment is not efficiently maintaining/controlling/handling the load. Based on such evaluation, the load can be distributed to one or more controllers and/or controller engine instances in order to effectively manage the load utilizing the resources/capabilities thereof.

It is to be appreciated that the controllers can contain software components and hardware components having inputs and/or outputs that can be utilized in connection with automating an industrial manufacturing device/process. Moreover, it is to be appreciated and understood that the controllers can be most any suitable portion of hardware and/or portion of software that receives and/or transmits inputs and/or outputs in order to control at least one of the load, a device, or a portion of a process. It is to be noted that a controller (e.g., a programmable logic controller (PLC), etc.) can be a dedicated piece of hardware that is self contained or in the case of a "soft PLC" a piece of software that runs on a computer and provides PLC-like control. For instance, in the case of a soft PLC, the load can be distributed to multiple soft PLCs and/or soft PLC engines associated with an industrial automation environment, wherein each soft PLC and/or the soft PLC engine can handle a portion of the load.

FIG. 9 illustrates a methodology 900 that facilitates evaluating a portion of a load to allocate to at least one controller within an industrial environment. At reference numeral 902, data related to an industrial environment can be received and/or evaluated. The industrial environment (e.g., an industrial environment, an automation environment, an environment, an automation industry, etc.) can employ a hierarchical representation of devices and/or processes. The hierarchy can be based at least in part upon the physical location of devices/processes (e.g., a region of a factory can have several defined sub-regions, which in turn can comprise sub-regions), standards associated with industry, such as ISA, S95, ISA S88, and the like, proprietary hierarchy that is provided by an enterprise, or any other suitable hierarchy. At reference numeral 904, data communication can be enabled between at least two controllers. Moreover, it is to be appreciated that the communication can be in real-time between a controller and a disparate controller, a controller and a controller engine instance, a controller engine instance and a disparate controller engine instance, a controller and a remote controller, a controller and a remote controller engine instance, a remote controller and a remote controller engine instance, and/or most any suitable combination of a controller, a remote controller, a controller engine instance, a remote controller engine instance, etc. For example, the data communicated can be related to load distribution, capacity of processing capabilities, available resources respective to controllers/controller engine instances, load assignment, etc. Thus, controller A can communicate in real-time to a disparate controller B that resources have been freed up to allow such controller A to assist in sharing the load related to controller B.

At reference numeral 906, a portion of the load can be allocated to at least one of a controller or a controller engine instance based at least in part upon one of the received data or the communication. In other words, the load can be dynamically shared across a plurality of controllers and/or controller engine instances by evaluating data within an industrial automation environment or data communicated between controllers (e.g., controllers, controller engine instances, remote controllers, etc.). For instance, a heavy and/or demanding load can be associated with an industrial automation environment, wherein such load can be evaluated in order for distribution amongst controllers and/or controller engine instances. Based on evaluating at least one of the controller or the load, portions of the load can be allocated and/or assigned to one of a controller, a controller engine instance, a remote controller, a remote controller engine instance, etc.

At reference numeral 908, the load allocation can be re-tuned based at least upon historic/trend data and/or continuous data analysis. The trend/historic data can be associated with at least one of an industrial environment, a device, a process, an application, a portion of a process, a controller, a characteristic of a controller (e.g., processor data, memory data, storage data, location, availability, etc.), and/or most any suitable data related to an industrial environment. Based on such received data, trends and/or tendencies can be extrapolated that are associated with the environment or load. Moreover, the trend/historic data can be identified and/or inferred trends, tendencies, patterns, sequences, and the like in order to facilitate distributing the load. Thus, it is to be appreciated that the shared load can be re-evaluated and re-distributed after an initial evaluation in order to ensure optimal use of resources (e.g., controller resources, controller processing capabilities, etc.).

Figure 10:
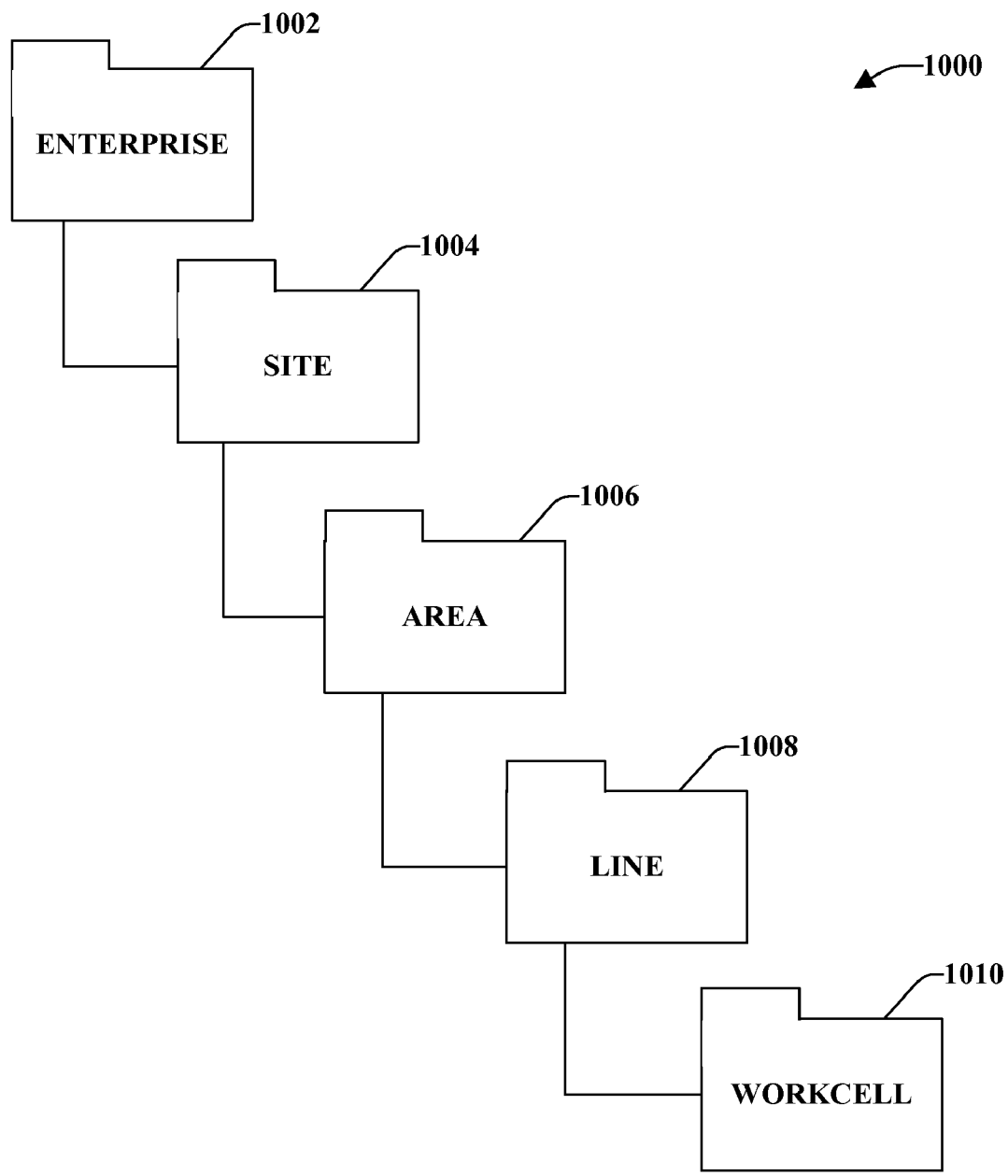
FIG. 10 illustrates a block diagram of an exemplary data structure that represents a hierarchical structure of an industrial automation system.

Referring now to FIG. 10, an exemplary hierarchical structure 1000 which can be utilized in connection with the hierarchically structured data model (e.g., hierarchical representation of assets) alluded to herein is illustrated. For example, the data model can facilitate nested structures, thereby mitigating deficiencies associated with data models that employ flat namespaces. The structure 1000 includes an enterprise level 1002, where a particular enterprise can be represented within data structured in accordance with a hierarchical data model. Beneath the enterprise level 1002 can be a site level 1004, so that a particular factory (site) within an enterprise can be represented within a data packet. Beneath the site level 1004 an area level 1006 can exist, which specifies an area within the factory that relates to the data. A line level 1008 can lie beneath the area level 1006, wherein the line level 1008 is indicative of a line associated with particular data. Beneath the line level 1008 a workcell level 1010 can exist, thereby indicating a workcell associated with the data. Utilizing a nested, hierarchical data model, PLCs can become more aware of data associated therewith. Furthermore, the hierarchy 1000 can be customized by an owner of such hierarchy. For instance, more granular objects/levels can be defined within the hierarchy 1000 in relation to the various assets associated therewith.

Figure 11:
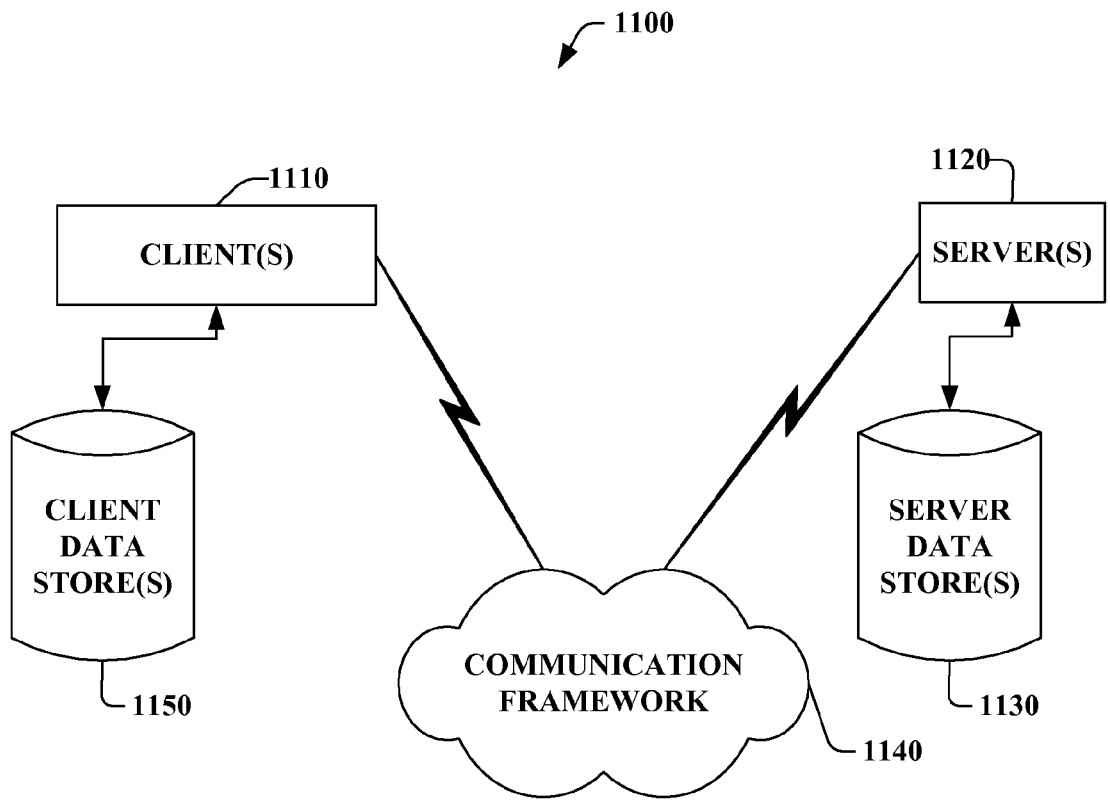
FIG. 11 is an exemplary computing environment that can be utilized in connection with the claimed subject matter.
Figure 12:
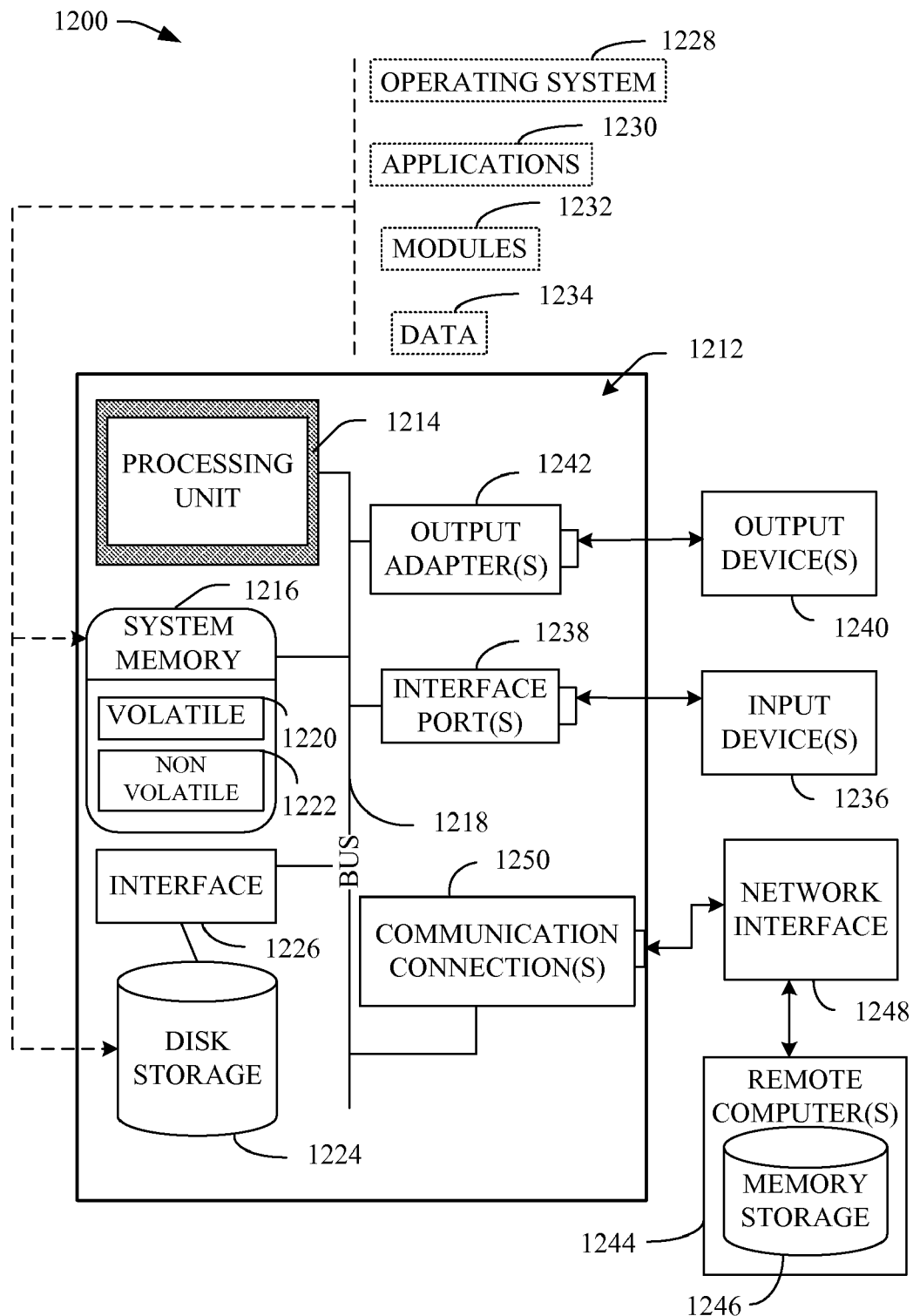
FIG. 12 is an exemplary networking environment that can be utilized in connection with the claimed subject matter.

In order to provide additional context for implementing various aspects of the claimed subject matter, FIGS. 11-12 and the following discussion is intended to provide a brief, general description of a suitable computing environment in which the various aspects of the subject innovation may be implemented. While the claimed subject matter has been described above in the general context of computer-executable instructions of a computer program that runs on a local computer and/or remote computer, those skilled in the art will recognize that the subject innovation also may be implemented in combination with other program modules. Generally, program modules include routines, programs, components, data structures, etc., that perform particular tasks and/or implement particular abstract data types.

Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based and/or programmable consumer electronics, and the like, each of which may operatively communicate with one or more associated devices. The illustrated aspects of the claimed subject matter may also be practiced in distributed computing environments where certain tasks are performed by remote processing devices that are linked through a communications network. However, some, if not all, aspects of the subject innovation may be practiced on stand-alone computers. In a distributed computing environment, program modules may be located in local and/or remote memory storage devices.

FIG. 11 is a schematic block diagram of a sample-computing environment 1100 with which the claimed subject matter can interact. The system 1100 includes one or more client(s) 1110. The client(s) 1110 can be hardware and/or software (e.g., threads, processes, computing devices). The system 1100 also includes one or more server(s) 1120. The server(s) 1120 can be hardware and/or software (e.g., threads, processes, computing devices). The servers 1120 can house threads to perform transformations by employing the subject innovation, for example.

One possible communication between a client 1110 and a server 1120 can be in the form of a data packet adapted to be transmitted between two or more computer processes. The system 1100 includes a communication framework 1140 that can be employed to facilitate communications between the client(s) 1110 and the server(s) 1120. The client(s) 1110 are operably connected to one or more client data store(s) 1150 that can be employed to store information local to the client(s) 1110. Similarly, the server(s) 1120 are operably connected to one or more server data store(s) 1130 that can be employed to store information local to the servers 1120.

With reference to FIG. 12, an exemplary environment 1200 for implementing various aspects of the claimed subject matter includes a computer 1212. The computer 1212 includes a processing unit 1214, a system memory 1216, and a system bus 1218. The system bus 1218 couples system components including, but not limited to, the system memory 1216 to the processing unit 1214. The processing unit 1214 can be any of various available processors. Dual microprocessors and other multiprocessor architectures also can be employed as the processing unit 1214.

The system bus 1218 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCM-CIA), Firewire (IEEE 1394), and Small Computer Systems Interface (SCSI).

The system memory 1216 includes volatile memory 1220 and nonvolatile memory 1222. The basic input/output system (BIOS), containing the basic routines to transfer information between elements within the computer 1212, such as during start-up, is stored in nonvolatile memory 1222. By way of illustration, and not limitation, nonvolatile memory 1222 can include read only memory (ROM), programmable ROM (PROM), electrically programmable ROM (EPROM), electrically erasable programmable ROM (EEPROM), or flash memory. Volatile memory 1220 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1212 also includes removable/non-removable, volatile/non-volatile computer storage media. FIG. 12 illustrates, for example a disk storage 1224. Disk storage 1224 includes, but is not limited to, devices like a magnetic disk drive, floppy disk drive, tape drive, Jaz drive, Zip drive, LS-100 drive, flash memory card, or memory stick. In addition, disk storage 1224 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1224 to the system bus 1218, a removable or non-removable interface is typically used such as interface 1226.

It is to be appreciated that FIG. 12 describes software that acts as an intermediary between users and the basic computer resources described in the suitable operating environment 1200. Such software includes an operating system 1228. Operating system 1228, which can be stored on disk storage 1224, acts to control and allocate resources of the computer system 1212. System applications 1230 take advantage of the management of resources by operating system 1228 through program modules 1232 and program data 1234 stored either in system memory 1216 or on disk storage 1224. It is to be appreciated that the claimed subject matter can be implemented with various operating systems or combinations of operating systems.

A user enters commands or information into the computer 1212 through input device(s) 1236. Input devices 1236 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1214 through the system bus 1218 via interface port(s) 1238. Interface port(s) 1238 include, for example, a serial port, a parallel port, a game port, and a universal serial bus (USB). Output device(s) 1240 use some of the same type of ports as input device(s) 1236. Thus, for example, a USB port may be used to provide input to computer 1212, and to output information from computer 1212 to an output device 1240. Output adapter 1242 is provided to illustrate that there are some output devices 1240 like monitors, speakers, and printers, among other output devices 1240, which require special adapters. The output adapters 1242 include, by way of illustration and not limitation, video and sound cards that provide a means of connection between the output device 1240 and the system bus 1218. It should be noted that other devices and/or systems of devices provide both input and output capabilities such as remote computer(s) 1244.

Computer 1212 can operate in a networked environment using logical connections to one or more remote computers, such as remote computer(s) 1244. The remote computer(s) 1244 can be a personal computer, a server, a router, a network PC, a workstation, a microprocessor based appliance, a peer device or other common network node and the like, and typically includes many or all of the elements described relative to computer 1212. For purposes of brevity, only a memory storage device 1246 is illustrated with remote computer(s) 1244. Remote computer(s) 1244 is logically connected to computer 1212 through a network interface 1248 and then physically connected via communication connection 1250. Network interface 1248 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1250 refers to the hardware/software employed to connect the network interface 1248 to the bus 1218. While communication connection 1250 is shown for illustrative clarity inside computer 1212, it can also be external to computer 1212. The hardware/software necessary for connection to the network interface 1248 includes, for exemplary purposes only, internal and external technologies such as, modems including regular telephone grade modems, cable modems and DSL modems, ISDN adapters, and Ethernet cards.

What has been described above includes examples of the subject innovation. It is, of course, not possible to describe every conceivable combination of components or methodologies for purposes of describing the claimed subject matter, but one of ordinary skill in the art may recognize that many further combinations and permutations of the subject innovation are possible. Accordingly, the claimed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable medium having computer-executable instructions for performing the acts and/or events of the various methods of the claimed subject matter.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A system that enables efficient load allocation within an industrial automation environment, comprising:
  a plurality of controllers associated with an industrial automation environment, wherein the plurality of controllers comprise a plurality of processors and a plurality of processing capabilities, wherein at least one of the plurality of controllers stores two or more controller engine instances in memory, wherein the two or more controller engine instances have two or more associated processing capabilities and execute on the at least one of the plurality of controllers; and
  a balance component that, in real-time, evaluates data associated with a load, the processing capabilities of the plurality of controllers or the processing capabilities of the two or more controller engine instances and self-tunes a distribution of the load across the plurality of controllers or the two or more controller engine instances according to the evaluation.

2. The system of claim 1, further comprising a distributed controller engine instance that concurrently executes on a portion of at least one of the plurality of controllers.

3. The system of claim 2, the balance component distributes a portion of the load to at least one of the two or more controller engine instances or the distributed controller engine instance.

4. The system of claim 1, the load is at least one of a control related to a portion of a device within the industrial automation environment, a control related to a portion of a process within the industrial automation environment, a receipt of data related to the industrial automation environment, a transmission of data related to the industrial automation environment, or a portion of processing that is managed by at least one of the plurality of controllers within the industrial automation environment.

5. The system of claim 1, the balance component distributes a portion of the load to at least one of a remote one of the plurality of controller or a remote one of the two or more controller engine instances.

6. The system of claim 1, further comprising the balance component enables real-time communication between two or more of the following: at least one of the plurality of controllers; at least one of the two or more controller engine instances; a remote one of the plurality of controllers; or a remote one of the two or more controller engine instances.

7. The system of claim 6, the balance component allocates a portion of the load to at least one of: at least one of the plurality of controllers, at least one of the two or more controller engine instances, a remote one of the plurality of controllers, or a remote one of the two or more controller engine instances based at least in part upon the real-time communication.

8. The system of claim 1, each of the plurality of controllers is a portion of hardware or portion of software that receives an input or transmits an output to control at least one of a portion of the load, a device, or a portion of a process.

9. The system of claim 8, at least one of the plurality of controllers is a soft programmable logic controller (PLC) that is a piece of software running on a machine to provide PLC-like control.

10. The system of claim 1, the industrial automation environment includes a plurality of devices, the plurality of devices are hierarchically represented based at least in part upon a physical location within the industrial automation environment.

11. The system of claim 1, the industrial automation environment includes a plurality of devices, the plurality of devices are hierarchically represented based at least in part upon an industry standard, wherein the industry standard is at least one of ISA S95, or ISA S88.

12. The system of claim 1, the industrial automation environment includes a plurality of devices, the plurality of devices are hierarchically represented based at least in part upon a proprietary hierarchy that is provided by an enterprise.

13. The system of claim 1, further comprising a trend component that extrapolates a tendency associated with at least one of the load or the processing capabilities of the plurality of controllers based on historic data, trend data, or continuous data analysis.

14. The system of claim 13, the balance component distributes a portion of the load based at least in part upon the tendency.

15. The system of claim 1, further comprising a security component that defines at least one of a security level, an authorization, or a privilege that corresponds to at least one of: at least one of the plurality of controllers a load distribution, or at least one of the two or more controller engine instances.

16. The system of claim 1, further comprising a search component that facilitates querying data associated with at least one of: at least one of the plurality of controllers, at least one of the two or more controller engine instances, a load distribution, or data related to the industrial automation environment.

17. The system of claim 1, further comprising a log component that tracks data related to trends.

18. The system of claim 1, further comprising a bridge component that provides a first network protocol utilized to carry data from at least one of: the plurality of controllers or the two or more controller engine instances and configures the data for transmittal over a second network protocol.

19. The system of claim 18, the bridge component bridges multiple communication networks.

20. The system of claim 18, the first network protocol is one of Fieldbus, Profibus, Hart, Modbus, ASI-bus, or Foundation Fieldbus.

21. The system of claim 20, the second network protocol is Common Industrial Protocol (CIP).

22. The system of claim 1, a first controller of the plurality of controllers communicates an availability of a portion of its resources or processing capabilities and the balance component shifts a portion of the load from a second controller of the plurality of controllers to the first controller of the plurality of controllers.

23. The system of claim 1, the balance component identifies an optimal load distribution based upon historical data associated with the industrial automation environment and allocates the load according to the optimal load distribution.

24. A method that facilitates enabling self-tuning in an industrial automation environment, comprising:
receiving data related to at least one controller within an industrial automation environment or data related to a load;
enabling real-time communication between at least two disparate controllers, wherein the at least two disparate controllers comprise at least two processors, wherein at least one of the at least two disparate controllers executes two or more controller engine instances, wherein at least one of the at least two disparate controllers communicates that a portion of its resources or at least a portion of resources associated with the two or more controller engine instances can be utilized to handle an additional portion of the load;
automatically allocating at least a portion of the load across the two or more disparate controllers or the at least two controller engine instances within the industrial automation environment based at least in part upon the received data or the communication; and
re-tuning the load allocation based upon an extrapolation of trends associated with the load, wherein the extrapolation is based upon at least one of historic data, trend data, or continuous data analysis.

25. The method of claim 24, the automatically allocating comprising managing at least one of a device or a portion of a process within the industrial environment.

26. The method of claim 24, the load is at least one of a control related to a portion of a device within the industrial automation environment, a control related to a portion of a process within the industrial automation environment, a receipt of data related to the industrial automation environment, a transmission of data related to the industrial automation environment, or a portion of processing that is managed by at least one of the two or more disparate controllers within the industrial automation environment.

27. A method for enabling efficient load allocation within an industrial automation environment, comprising:

adjusting a distribution of a load between a plurality of controllers in real time, the plurality of controllers comprising a plurality of processors and wherein at least one of the plurality of controllers executes two or more controller engine instances, based upon an evaluation of at least one of the load, a processing capability associated with at least one of the plurality of controllers, or a processing capability associated with at least one of the two or more controller engine instances; and receiving data related to an industrial automation system, extrapolating trends from the data related to the industrial automation system and automatically re-distributing the load between the plurality of controllers or the two or more controller engine instances based upon the trends.

28. The system of claim 27, further comprising querying data associated with at least one of the plurality of controllers.

29. The system of claim 27, further comprising bridging multiple communication networks employing a first network protocol to carry data from at least one of the plurality of controllers and configuring the data for transmittal over a second network protocol.

* * * * *